3,791,979
ACTIVATED CHLORATE
Harold de Vere Partridge, Wilson, N.Y., assignor to Hooker Chemical Corporation, Niagara Falls, N.Y.
No Drawing. Original application Feb. 16, 1971, Ser. No. 115,730. Divided and this application Dec. 10, 1971, Ser. No. 206,894
Int. Cl. C01b 11/14
U.S. Cl. 252—187                                6 Claims

ABSTRACT OF THE DISCLOSURE

Activated alkali metal chlorate compositions for use in bleaching processes are produced by dissolving an amount of an activator selected from the water soluble salts of silver, manganese, arsenic, hexavalent chromium and vanadium pentoxide in an aqueous solution of an alkali metal chlorate and co-precipitating the activator in homogeneous admixture with the chlorate salt.

This is a division of application Ser. No. 115,730, filed Feb. 16, 1971.

BACKGROUND OF THE INVENTION

The invention relates to methods for preparing compositions of matter and to those compositions of matter which entail an activated alkali metal chlorate.

It is known that alkali metal chlorates may be reduced under certain conditions to produce chlorine dioxide, a very desirable bleaching agent. Conventionally chlorine dioxide is produced in a reactor, absorbed in water and conveyed to the site of use. Attempts to employ activated forms of alkali metal chlorates directly at a bleaching site have been unsuccessful largely because of excessively low reaction rates coupled with excessive hydrolytic degradation of the material being bleached.

THE INVENTION

In accordance with this invention there is provided an activated alkali metal chlorate composition and, for the production of that composition, a process which comprises adding at least one activating member selected from the group of vanadium pentoxide, silver ions, manganous ions and dichromate ions to an aqueous solution containing from about 300 to about 1150 grams of alkali metal chlorate per lite at from ambient temperature to about 100 degrees centigrade and thereafter crystallizing said activated alkali metal chlorate in admixture with said activating member.

The novel bleaching compositions of this invention consist essentially of an alkali metal chlorate and at least one member of the group consisting of the salts of silver, manganese, pentavalent vanadium (pentoxide), and hexavalent chromium (dichromate). In addition to those compositions, chloride and $SO_2$ containing salts may be present in the composition of this invention.

By salts of silver, manganese, pentavalent vanadium (pentoxide) and hexavalent chromium (dichromate) applicant means any form of those materials which will provide the ionic forms of the additive material under $ClO_2$ generating conditions. For example, silver ions may be provided via silver, its inorganic salts such as the nitrate, chloride, sulfate, chlorate, and the like as well as in organic form such as the formate, oxalate, acetate, acetylacetonate, and the like. The hexavalent chromium is most conveniently supplied as sodium dichromate, but other forms of hexavalent chromium may be used such as the oxide, which will form the dichromate ion in situ. The other activators are supplied in like manner to supply the desired ionic form of the additive.

To the dry compositions of matter of this invention, there may be added materials which will, upon dissolution in water, supply the chloride or sulfite ion. These materials may be the alkali metal salts and, in the case of the sulfite ion, the meta bisulfite salt is an especially advantageous form.

By dissolving the activating compound in the aqueous solution containing an alkali metal chlorate prior to crystallization, the resulting crystalline chlorate product contains either in admixture or intimately bound into its crystalline matrix, an amount of the desired activator sufficient to provide a solid mixture which may be used directly in the bleaching process. Although an amount of the activator may be added to an alkali metal chlorate in the dry state to provide a heterogenous composition, such compositions are not as satisfactory because they are not readily subdividable into aliquot proportions for small scale bleaching operations. The homogeneous compositions of the instant invention have sufficient homogeneity that any division of the total package product may be used with equivalent results. Furthermore, the homogeneous product of the instant invention is instantly functional upon dissolution in aqueous medium due to its homogeneity whereas the physical admixtures of activating compounds and alkali metal chlorate require at least total dissolution in an aqueous system in addition to the required diffusion time of the ions to reach their maximum $ClO_2$ generating efficiency.

Furthermore, the addition of an activating composition to the alkali metal chlorate prior to crystallization avoids the necessity for an additional step at the bleaching mill operation for the purpose of mixing the correct proportions of the activator compositions and/or reducing agent with the alkali metal chlorate prior to use.

An amount of the activating composition is dissolved in the aqueous alkali metal chlorate solution to afford, via absorption, or integration into the chlorate crystalline matrix, an amount of the activator in the resulting crystalline composition which will provide upon dissolution in aqueous medum the desired ratio of activator to alkali metal chlorate.

The activators contemplated by the instant invention include the silver ion, the manganous ion, hexavalent chromium ions, and vanadium pentoxide. The form in which vanadium pentoxide appears in aqueous solution is not known. It is assumed, although applicants do not desire to be bound by this theory, that vanadium is present in the activating state as pentavalent vanadium. Hence, throughout this application and in the claims, reference will be made to pentavalent vanadium with the intention of covering that form of vanadium which results from dissolution of vanadium pentoxide in an aqueous medium with an alkali metal chlorate and a strong mineral acid and a reducing agent. Of these activators, the most desirable are the silver and maganous ions. The manganous ion is especially useful because of its activating characteristics and due to the fact that in physical appearance it provides a pink cast to the alkali metal chlorate which is a distinctive formulation for purposes of safely providing a characterizing quality to the composition of matter whch is very useful to the operator. The hexavalent chromium activator provides a yellowish cast to the alkali metal chlorate which is somewhat distinctive but not as characterizing as is the manganous ions. The silver and pentavalent vanadium activators produce a white product. The mixtures of silver and manganous activators appear to provide the greatest activity in the alkali metal chlorate. Although silver is more active than is manganous ion itself. Silver provides a unique activator for an alkali metal chlorate in that in the presence of an alkali metal chloride, it remains in solution in the presence of the chloride ion and, it is believed, crystallizes from the solution as the chlorate.

The concentration of the alkali metal chlorate in aqueous solution at the time of addition of the activator is from about 300 grams per liter to the point of saturation (approximately 1150 grams per liter at 100 degrees centigrade). In essence, it is contemplated that the activator may be added to an alkali metal chlorate solution at the evaporator stage or crystallizer stage in a conventional electrolytic chlorate cell operation. The mount of activator leaving solution with the alkali metal chlorate as it crystallizes appears to be dependent upon the concentration of the activator in aqueous solution rather than the concentration of alkali metal chlorate.

The concentration of the alkali metal chlorate in aqueous solution employed for chlorine dioxide generation may vary from about 0.5 to about 5 molar. Generally, it is preferred to maintain the chlorate concentration below about 3.5 molar and more preferably in the range from 1.0 to 3.0 molar, to prevent any chance of loss by co-crystallization from solution.

The concentration of the activator desired in the aqueous $ClO_2$ generating solution varies with the activator. Thus, silver ions may be present in the aqueous solution in an amount from about 0.0001 to about 1.5 grams per liter. Manganous ions are desired in the range from 0.001 to about 4 grams per liter. The dichromate ion is desired in the range of from about 0.5 to 25 grams per liter while the arsenic ion and vanadium pentoxide are useful in amounts from about 0.5 to about 25 grams per liter.

Thus, the dry compositions of matter of this invention consist essentially of an alkali metal chlorate and for each gram of alkali metal chlorate an amount of at least one activator selected from the group consisting of (a) $2(10^{-7})$ to $3(10^{-2})$ grams silver,
(b) $2(10^{-6})$ to $8(10^{-2})$ grams manganse,
(c) $1(10^{-3})$ to $5(10^{-1})$ grams dichromate,
(d) $1(10^{-3})$ to $5(10^{-1})$ grams vanadium pentoxide,
(e) $1(10^{-3})$ to $5(10^{-1})$ grams arsenic.

Any alkali metal chlorate may be used in the formulation of the bleaching compositions of the instant invention. Generally, the alkali metal chlorates such as the lithium, potassium, sodium, cesium, and rubidium chlorates are commercially produced. However, the alkaline earth metal chlorates such as calcium, magnesium, and barium chlorates are operable. Since sodium chlorate is the most common chlorate produced, it is treated throughout this application as the form of alkali metal chlorate.

The alkali metal chlorate and the activator composition are removed from aqueous solution by crystallization. It is within the skill of the art to first evaporate water from the aqueous solution and subsequently cool to crystallize. It is also within the skill of the art to prepare the desired concentrations of activator and alkali metal chlorate and evaporate solution to dryness to produce the crystalline product. However, it is most desirable to prepare the solution at about 100 degrees centigrade and to crystallize the produce by relatively slow cooling.

After the activator alkali metal chlorate has been crystallized, a reducing agent may be physically admixed with it to provide a complete composition of master useable as a bleaching powder upon addition to an acidic solution. The reducing agents contemplated by the instant invention are the alkali metal chloride or alkali metal bisulfite or metabisulfite salts. These reducing agents may be physically admixed with the activated chlorate composition in an amount substantially equimolar to the alkali metal chlorate or in slight excess thereto. Thus, an amount of an alkali metal chloride may be physically admixed with an activated alkali metal chlorate composition to provide from between 1.0 to about 1.3 moles of chloride mole of chlorate.

One way to use the activated chlorate composition of this invention is, if necessary, premixed with a reducing agent such as an alkali metal chloride or an alkali metal bisulfite or meta bisulfite and is dissolved in an aqueous slurry of a cellulosic material at from about 3 to about 20 percent consistency. The aqueous slurry is then acidified with a mineral acid to generate $ClO_2$ in situ. If the acid is HCl, a satisfactory $ClO_2$ generating rate is achieved at acid normalities as low as 0.05 N while acid normalities generally above 2 N are required for use of sulfuric acid.

A continuous process employing the activated chlorate composition of this invention which is readily adaptable to wood pulp bleaching processes involves introducing the activated chlorate composition into a pulp slurry which is acidified continuously.

Preferably the activated chlorate composition of this invention is employed as the feed material for a chlorine dioxide generation in accordance with the procedures disclosed in co-pending application 710,648, filed Mar. 5, 1968 by Partridge et al.

EXAMPLE

To a one liter aqueous solution containing 530 grams sodium chlorate at 100° C. is added 0.1 gram silver nitrate. The solution is slowly cooled to co-precipitate sodium chlorate and a silver salt.

106.5 grams of the solid product produced by co-precipitation of sodium chlorate and silver nitrate from aqueous solution is dissolved in one liter of water containing 61.5 grams sodium chloride. To the solution is slowly added sulfuric acid. The evolution of gas from solution is noted approximately at the point at which a 2 normal solution of sulfuric acid is formed. The evolution of $ClO_2$ is readily made continuous by the introduction of additional amounts of the co-precipitated silver-sodium chlorate salt mixture in addition to sodium chloride and sulfuric acid.

The same results are obtained by forming co-precipitated solid salt compositions with sodium chloride and manganous chloride, oxalate or sulfate. Likewise, salts of arsenic, vanadium pentoxide and the dichromate salts co-precipitate with sodium chlorate to afford activated sodium chlorate for use as bleaching powders via chlorine dioxide generation.

What is claimed is:

1. A composition consisting essentially of a crystallized alkali metal chlorate having homogeneously dispersed in crystallized admixture therewith at least one activator selected from the group consisting of the water soluble salts of silver, manganese, arsenic, pentavalent vanadium and hexavalent chromium, the weight ratio of alkali metal chlorate to said activator being $1:2(10^{-7})$ to $5(10^{-1})$.

2. The composition of claim 1 in which said activator is silver in an amount from $2(10^{-7})$ to $3(10^{-2})$ by weight based upon the alkali metal chlorate.

3. The composition of claim 1 in which said activator is manganese in an amount from $2(10^{-6})$ to $8(10^{-2})$ by weight based upon the alkali metal chlorate.

4. The composition of claim 1 in which said activator is hexavalent chromium in an amount from $1(10^{-3})$ to $5(10^{-1})$ by weight based upon the alkali metal chlorate.

5. The composition of claim 1 in which said activator is pentavalent vanadium in an amount from $1(10^{-3})$ to $5(10^{-1})$ by weight based upon the alkali metal chlorate.

6. The composition of claim 1 in which said activator is arsenic in an amount from $1(10^{-3})$ to $5(10^{-1})$ by weight based upon the alkali metal chlorate.

References Cited

UNITED STATES PATENTS 3,563,702 2/1971 Partridge et al. ___ 252—187 R X
3,585,147 6/1971 Gordon _____ 252—187 R X MAYER WEINBLATT, Primary Examiner US. Cl. X.R.

8—108, 109; 23—152

PO-1050
(5/69)

UNITED STATES PATENT OFFICE
CERTIFICATE OF CORRECTION

Patent No. 3,791,979  Dated February 12, 1974

Inventor(s) Harold de Vere Partridge

It is certified that error appears in the above-identified patent and that said Letters Patent are hereby corrected as shown below:

Column 1, line 45, "lite" should read --liter--. Column 3, line 9, "mount" should read --amount--; line 35, "manganse" should read --manganese--; line 61, "master" should read --matter--; line 72, "mole of chlorate" should read --per mole of chlorate--.

Signed and sealed this 2nd day of July 1974.

(SEAL)
Attest:

EDWARD M. FLETCHER,JR.
Attesting Officer

C. MARSHALL DANN
Commissioner of Patents